United States Patent
Toula (10) Patent No.: US 11,404,920 B2
(45) Date of Patent: Aug. 2, 2022

(54) METHODS AND APPARATUS FOR PROTECTING WIRELESS CHARGING RECEIVERS

(71) Applicant: STMICROELECTRONICS DESIGN AND APPLICATION S.R.O., Prague (CZ)

(72) Inventor: Michal Toula, Prague (CZ)

(73) Assignee: STMICROELECTRONICS DESIGN AND APPLICATION S.R.O., Prague (CZ)

( * ) Notice: Subject to any disclaimer, the term of this patent is extended or adjusted under 35 U.S.C. 154(b) by 255 days.

(21) Appl. No.: 16/878,782

(22) Filed: May 20, 2020

(65) Prior Publication Data

US 2021/0367456 A1  Nov. 25, 2021

(51) Int. Cl.
*H02J 50/80* (2016.01)
*H02J 50/12* (2016.01)
*H02J 7/00* (2006.01)
*H02H 9/04* (2006.01)

(52) U.S. Cl.
CPC .......... *H02J 50/80* (2016.02); *H02H 9/043* (2013.01); *H02J 7/00308* (2020.01); *H02J 50/12* (2016.02)

(58) Field of Classification Search
CPC ......... H02H 9/043; H02H 9/041; H02J 50/80; H02J 7/00308; H02J 50/12
See application file for complete search history.

(56) References Cited

U.S. PATENT DOCUMENTS

| 4,316,134 A * | 2/1982 | Balan ........................ H02J 7/14 |
| | | 320/136 |
| 2014/0002006 A1 * | 1/2014 | Zhang .................. H02J 7/00308 |
| | | 361/86 |
| 2014/0063666 A1 | 3/2014 | Kallal et al. |
| 2014/0327393 A1 | 11/2014 | Lee et al. |

(Continued)

FOREIGN PATENT DOCUMENTS

| CN | 106911194 A * | 6/2017 | ............. H02H 9/043 |
| WO | WO-2021215696 A1 * | 10/2021 | ............. H01F 38/04 |

OTHER PUBLICATIONS

Wireless Power Consortium, "Introduction to the Power Class 0 Specification," Version 1.2.3, Feb. 2017, 16 pages.

(Continued)

*Primary Examiner* — Stacy Whitmore
(74) *Attorney, Agent, or Firm* — Slater Matsil, LLP (57) ABSTRACT

A wireless charging receiver includes a controller configured to determine that a first overvoltage threshold is met and based thereon enable a first switch to couple an output of a rectifier to electrical ground through a first resistor, to determine that a second overvoltage threshold is met and based thereon enable receive resonant circuit switches to short circuit a receive resonant circuit, to determine that a hysteresis threshold is met and based thereon disable the receive resonant circuit switches to open circuit the receive resonant circuit, and to determine that a hysteresis cycle threshold is met and that the receive resonant circuit switches are disabled and based thereon enable the second switch to couple the second resistor to the electrical ground and to communicate to wireless charging transmitter to decrease the power level on wireless charging receiver side.

20 Claims, 8 Drawing Sheets

(56) References Cited

U.S. PATENT DOCUMENTS

| | | | |
|---|---|---|---|
| 2015/0061588 A1* | 3/2015 | Alves | H02J 50/80 |
| | | | 320/108 |
| 2016/0294180 A1* | 10/2016 | Pagano | H02H 3/20 |
| 2017/0104368 A1 | 4/2017 | Radke et al. | |
| 2017/0126066 A1* | 5/2017 | Von Novak, III | H02J 50/12 |
| 2018/0083487 A1* | 3/2018 | Nalbant | H02J 7/0029 |
| 2020/0343720 A1* | 10/2020 | Gu | H02H 9/04 |
| 2021/0091597 A1* | 3/2021 | Hegde | H02J 50/10 |
| 2021/0376642 A1* | 12/2021 | Gu | H02J 7/00308 |

OTHER PUBLICATIONS

Wireless Power Consortium, "The Qi Wireless Power Transfer System Power Class 0 Specification; Parts 1 and 2: Interface Definitions," Version 1.2.3, Feb. 2017, 165 pages.

Wireless Power Consortium, "The Qi Wireless Power Transfer System Power Class 0 Specification; Part 4: Reference Designs," Version 1.2.3, Feb. 2017, 337 pages.

\* cited by examiner

METHODS AND APPARATUS FOR PROTECTING WIRELESS CHARGING RECEIVERS

TECHNICAL FIELD

The present invention relates generally to methods and apparatus for protecting wireless charging receivers.

BACKGROUND

Powering electronic devices has been a challenge for system designers. Early electronic devices were tethered to an electrical power source by a power cord. Batteries provided freedom to move around, but the batteries still required replacement or recharging. Recharging the batteries required the batteries or the electronic devices be plugged into an electrical power source using a power cord.

Wireless charging systems eliminate the power cord by transferring power in free space, where the power can be used to charge the rechargeable batteries or directly power the electronic device. Wireless charging systems eliminate difficulties associated with plugging the power cord to the electronic device, such as fumbling with the orientation of the plug, ensuring that the correct power cord is being used, wearing out of physical connectors and connections, and so on. Therefore, wireless charging systems are attractive to end-users.

SUMMARY

In accordance with an embodiment, a wireless charging receiver is provided. The wireless charging receiver includes a voltage rectifier operatively coupled to a receive resonant circuit, the voltage rectifier configured to output a direct current (DC) voltage in accordance with received energy received by the receive resonant circuit from a wireless charging transmitter; a first resistor operatively coupled to an output of the voltage rectifier; a second resistor operatively coupled to the output of the voltage rectifier; receive resonant circuit switches operatively coupled to the receive resonant circuit; a first switch operative coupled between the first resistor and an electrical ground; a second switch operatively coupled between the second resistor and the electrical ground; and a controller operatively coupled to the receive resonant circuit switches, the first switch, and the second switch, the controller programmed to determine that a first overvoltage threshold is met and based thereon enable the first switch to couple the first resistor to the electrical ground, determine that a second overvoltage threshold is met and based thereon enable the receive resonant circuit switches to short circuit the receive resonant circuit, determine that a hysteresis threshold is met and based thereon disable the receive resonant circuit switches to open circuit the receive resonant circuit, and determine that a hysteresis cycle threshold is met and based thereon enable the second switch to couple the second resistor to the electrical ground.

In accordance with an embodiment, method implemented by a wireless charging receiver is provided. The method includes detecting that a first overvoltage threshold is met, and based thereon, enabling a first switch to couple a first resistor to an electrical ground, the first resistor being coupled to an output of a rectifier of the wireless charging receiver; detecting that a second overvoltage threshold is met, and based thereon, enabling receive resonant circuit switches to short circuit a receive resonant circuit of the wireless charging receiver; detecting that a hysteresis threshold is met and based thereon, disabling the receive resonant circuit switches to open circuit the receive resonant circuit; and detecting that a hysteresis cycle threshold is met, and that the receive resonant circuit switches are disabled, and based thereon, enabling a second switch to couple a second resistor to the electrical ground.

In accordance with an embodiment, a wireless charging receiver is provided. The wireless charging receiver includes a voltage rectifier operatively coupled to a receive resonant circuit, the voltage rectifier configured to output a direct current (DC) voltage in accordance with received energy received by the receive resonant circuit from a wireless charging transmitter; a first resistor operatively coupled to an output of the voltage rectifier; a second resistor operatively coupled to the output of the voltage rectifier; receive resonant circuit switches operatively coupled to the receive resonant circuit; a first switch operatively coupled between the first resistor and an electrical ground; a second switch operatively coupled between the second resistor and the electrical ground; a non-transitory memory storage comprising instructions; and one or more processors in communication with the memory storage, wherein the one or more processors execute the instructions to: determine that a first overvoltage threshold is met, and based thereon, enable the first switch to couple the first resistor to the electrical ground, the first resistor being coupled to an output of a rectifier of the wireless charging receiver; determine that a second overvoltage threshold is met, and based thereon, enable receive resonant circuit switches to short circuit the receive resonant circuit of the wireless charging receiver; determine that a hysteresis threshold is met, and based thereon, disable the receive resonant circuit switches to open circuit the receive resonant circuit; and determine that a hysteresis cycle threshold is met and that the receive resonant circuit switches are disabled, and based thereon, enable the second switch to couple the second resistor to the electrical ground.

An advantage of an embodiment is that the overvoltage condition is mitigated, preventing potential damage to the wireless charging receiver, while enabling communication between the wireless charging receiver and the wireless charging transmitter so that the overvoltage condition can be remedied without interruption of the power transfer.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

In the ensuing description one or more specific details are illustrated, aimed at providing an understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the scope of protection or the scope of the embodiments.

In wireless charging, electromagnetic coupling is used to enable wireless energy transfer. Energy is transferred from wireless charging transmitter to wireless charging receiver using electric fields, magnetic fields, electromagnetic fields, and so on, when the wireless charging transmitter outputs power into a wireless field by a transmit coil that is received or coupled by a receive coil of the wireless charging receiver. The transmitting and receiving process results in a wireless power transfer from the wireless charging transmitter to the wireless charging receiver.

Figure 1:
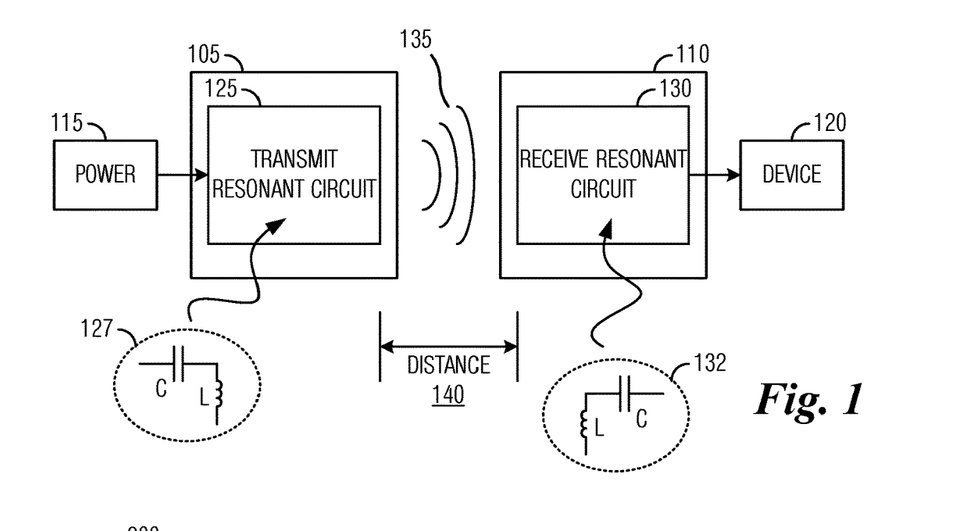
FIG. 1 illustrates a conventional wireless charging system.

FIG. 1 illustrates a conventional wireless charging system 100. Wireless charging system 100 includes a wireless charging transmitter 105 and a wireless charging receiver 110. Wireless charging transmitter 105, coupled to a power source 115, provides energy to wireless charging receiver 110, which in turn, provides power to a device 120. The power provided to device 120 may be used to charge rechargeable batteries in device 120 or to directly power device 120. The process of providing energy is referred to as a power transfer.

Wireless charging transmitter 105 includes a transmit resonant circuit 125. A resonant circuit may be characterized by an inductance (L) and a capacitance (C) of the resonant circuit (shown in highlighted regions 127 and 132), and the power transferred between wireless charging transmitter 105 and wireless charging receiver 110 is a function of both the inductance and the capacitance of the resonant circuits of the wireless charging transmitter 105 and the wireless charging receiver 110. The purpose of the capacitance (C) is to enhance the efficiency of the power transfer and inductance L is used to transfer the power (transmit coil converts electric current into magnetic flux and receive coil converts magnetic flux into electromotive force). Transmit resonance circuit 125 transmits an energized wireless field (shown as lines 135) using the transmit coil. The energized wireless field (lines 135) is received by a receive resonant circuit 130 of wireless charging receiver 110. In addition to transmitting and receiving energized wireless fields, a changing of parameters of receive resonant circuit 130 may be used to communicate from wireless charging receiver 110 to wireless charging transmitter 105. For example, in communications between wireless charging receiver 110 to wireless charging transmitter 105, the information being communicated may be used to modulate the amplitude of the wireless fields, thereby enabling the transmission or reception of the information. For example, in communications between wireless charging transmitter 105 to wireless charging receiver 110, the information being communicated may be used to modulate the frequency of the wireless fields, thereby enabling the transmission or reception of the information. As an example, wireless charging transmitter 105 and wireless charging receiver 110 communicate to initiate a wireless charging session, set a charging mode, control the amount of energy transmitted by wireless charging transmitter 105, control the amount of energy received by wireless charging receiver 110, terminate a wireless charging session, and so on. The communication performed is mainly in the uplink direction, e.g., from wireless charging receiver 110 to wireless charging transmitter 105. Details of the communication can be found in Qi standard defined by the wireless power consortium (WPC).

Wireless charging transmitter 105 and wireless charging receiver 110 are a distance 140 apart. In general, given a fixed energy transmission level, and for a transmit coil design, the amount of energy received by wireless charging receiver 110 is dependent upon a separation between the coil of wireless charging transmitter 105 and wireless charging receiver 110. As an example, for a coil design that remains constant, the energy received by wireless charging receiver 110 is usually larger when distance 140 is small, and the energy received by wireless charging receiver 110 is usually smaller when distance 140 is large. It is possible to compensate for increased distance 140 by increasing the transmitted energy level of wireless charging transmitter 105.

In addition to the distance between the wireless charging transmitter and the wireless charging receiver, another physical factor that has a role in determining the energy received by the receive coil of the wireless charging receiver is the misalignment of the transmit coil and the receive coil. The misalignment of the two coils may be defined as a spatial difference along one axis (or two axes) of the centers of the two coils. As an example, if the wireless charging transmitter and the wireless charging receiver are located on a table where the location of the wireless charging transmitter and the wireless charging receiver is limited to being at different locations on the table top, then the misalignment of the transmit coil and the receive coil is expressible in only one of the two axes (e.g., up/down or left/right), with the distance between the wireless charging transmitter and the wireless charging receiver is the other axis. As another example, if the wireless charging transmitter and the wireless charging receiver can be freely located in three dimensions, then the misalignment of the transmit coil and the receive coil is expressible in two of the three axes (e.g., up/down and left/right, up/down and in/out, or left/right and in/out), with the distance between the wireless charging transmitter and the wireless charging receiver is the third axis.

The distance and the misalignment may be combined to characterize the alignment of the wireless charging devices. As an example, for a particular coil design, if the distance between the wireless charging devices is small and the misalignment is also small, the wireless charging devices may be said to be well aligned. As another example, for a particular coil design, if the distance between the wireless charging devices is large and the misalignment is also large, the wireless charging devices may be said to be poorly aligned.

Figure 2A:
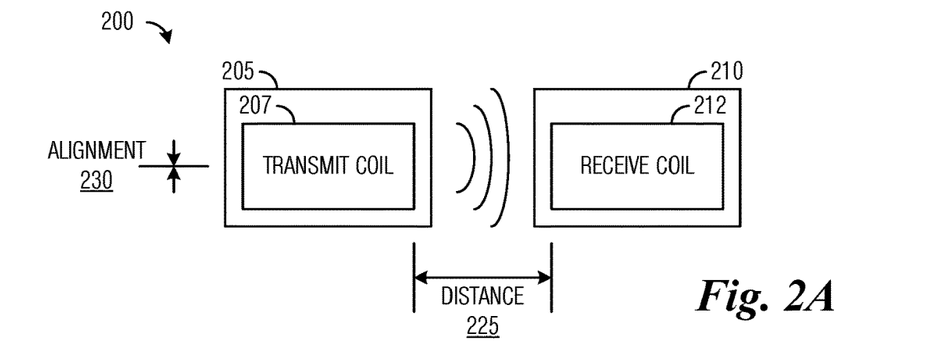
FIG. 2A illustrates a conventional wireless charging system highlighting well aligned wireless charging devices.

FIG. 2A illustrates a conventional wireless charging system 200 highlighting well aligned wireless charging devices. Wireless charging system 200 includes a wireless charging transmitter 205 with a transmit resonant circuit with a transmit coil 207 and a wireless charging receiver 210 with a receive resonant circuit with a receive coil 212. Wireless charging transmitter 205 and wireless charging receiver 210 are positioned on a table top, so there are only two axes of freedom. Transmit coil 207 and receive coil 212 are distance 225 apart. The misalignment (shown as alignment 230) of transmit coil 207 and receive coil 212 is very small. Because transmit coil 207 and receive coil 212 have small misalignment (because alignment 230 is very good) and the separation is also small, the wireless charging devices may be considered to be well aligned.

Figure 2B:
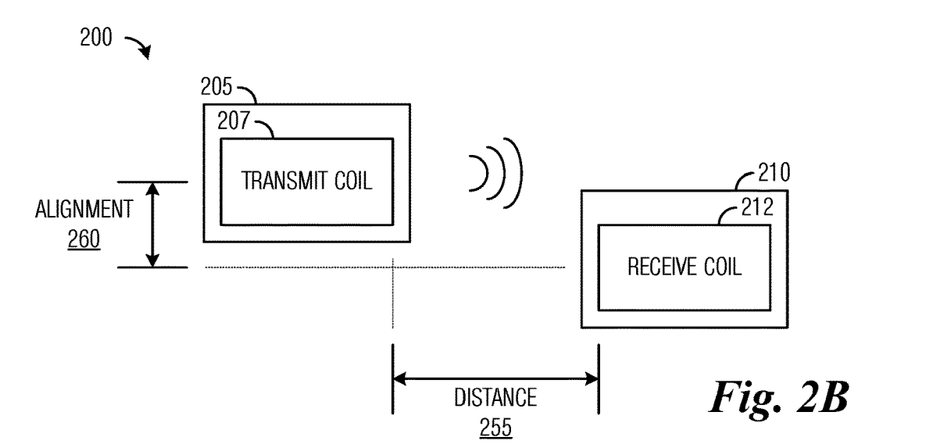
FIG. 2B illustrates a conventional wireless charging system highlighting a situation where the wireless charging devices are poorly aligned.

FIG. 2B illustrates a conventional wireless charging system 200 highlighting a situation where the wireless charging devices are poorly aligned. In the situation shown in FIG. 2B, transmit coil 207 and receive coil 212 are distance 225 apart, and the misalignment (shown as alignment 260) of transmit coil 207 and receive coil 212 is large. Because transmit coil 207 and receive coil 212 have large misalignment (because alignment 260 is poor) and the separation is also large, the wireless charging devices may be considered to be poorly aligned.

It is possible that once a wireless charging session begins, the alignment of the wireless charging transmitter and the wireless charging receiver changes, thereby changing the coil coupling (which is a function of the alignment of the wireless charging transmitter and the wireless charging receiver). Improving the alignment of the wireless charging transmitter and the wireless charging receiver will tend to increase the coil coupling and increase received energy at the wireless charging receiver. As an example, a user may notice that the wireless charging receiver (e.g., a smart telephone with a built-in wireless charging receiver) is poorly placed on the wireless charging transmitter and move the wireless charging receiver so that it is closer to (or in better alignment with or both closer to and in better alignment with) the wireless charging transmitter. The movement of the wireless charging receiver (in relation to the wireless charging transmitter) by the user will change the coil coupling, and hence, change the received energy at the wireless charging receiver.

Once the alignment changes, the coil coupling changes and the received energy at the wireless charging receiver also changes. As an example, if the alignment changes from poorly aligned to well aligned, the coil coupling increases and the received energy may change from small to large. The increased received energy increases the power available to recharge the rechargeable batteries or power the electronic device.

In general, the wireless charging transmitter adjusts its operating point, such as the frequency, duty cycle, inverter voltage, and so on, only based on a request from the wireless charging receiver. Because the received energy at the wireless charging receiver is based on the operating point of the wireless charging transmitter and the load changes, coil coupling (e.g., the alignment) can have an impact on the received energy.

However, the increased received energy may exceed power limitations of a wireless charging receiver (such as wireless charging receiver 110), leading to damage of the wireless charging receiver. Therefore, there is a need for methods and apparatus for protecting wireless charging receivers.

Figure 3:
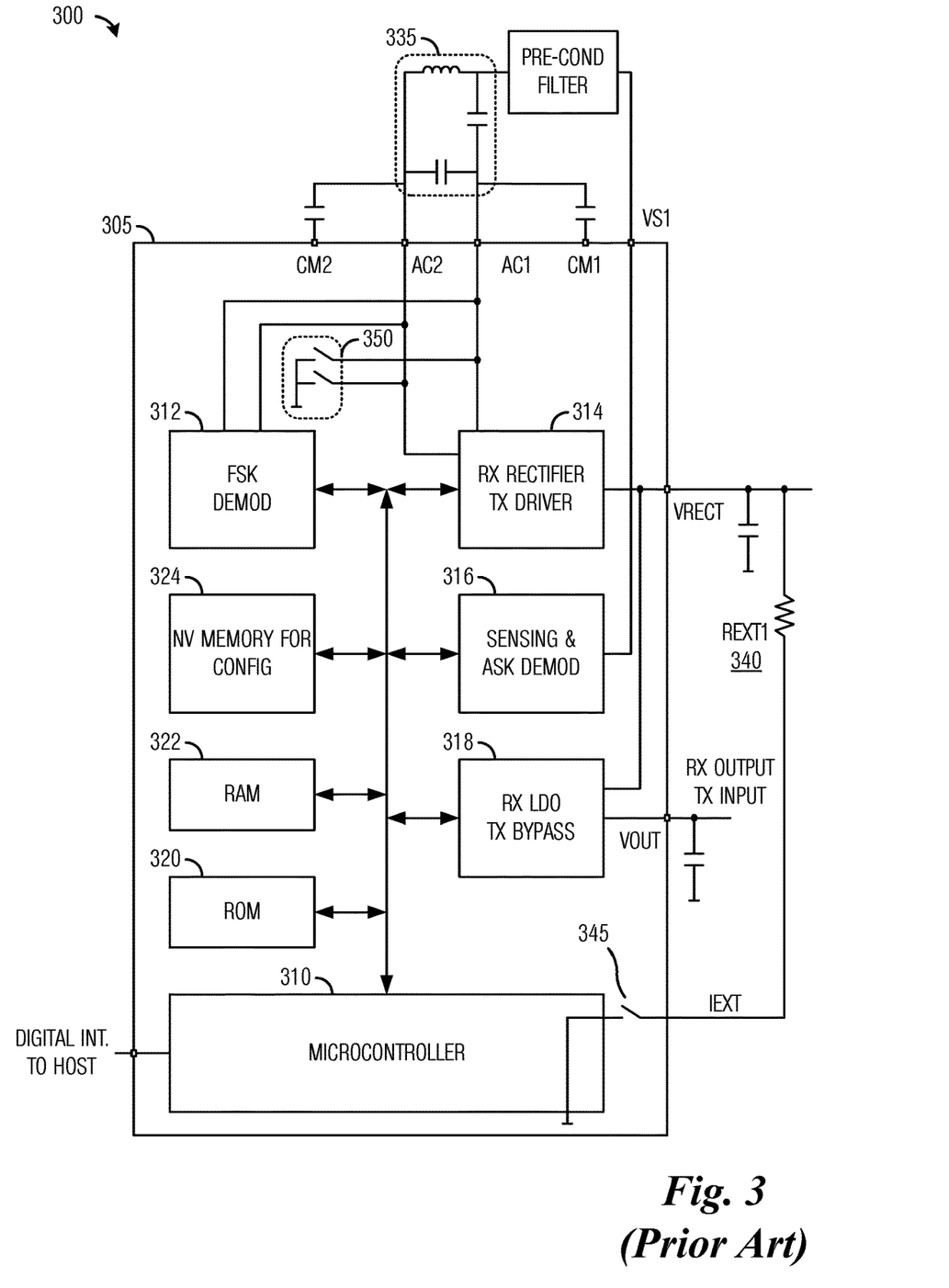
FIG. 3 illustrates a prior art wireless charging receiver.

FIG. 3 illustrates a prior art wireless charging receiver 300. Wireless charging receiver 300 includes an integrated circuit 305 that controls the operation of wireless charging receiver 300, including communicating with a wireless charging transmitter, establishing a wireless charging session, controlling the power provided to an electronic device coupled to wireless charging receiver 300, etc. Integrated circuit 305 includes a microcontroller 310 that executes programs to control the operation of wireless charging receiver 300, a frequency shift keying (FSK) demodulation circuit 312 that demodulates FSK communication from a wireless charging transmitter, a receiver (RX) rectifier/transmit (TX) driver circuit 314 that rectifies an alternating current (AC) signal received wirelessly by wireless charging receiver 300 (from the wireless charging transmitter) or drives a signal transmitted by wireless charging receiver 300 when operating as a wireless charging transmitter, a sensing and amplitude shift keying (ASK) demodulator circuit 316 that senses and demodulates ASK modulated signals (when operating as a wireless charging transmitter), a RX low dropout (LDO) circuit 318 that regulates voltages, and memory (including read-only memory (ROM) 320 to store code executed by microcontroller 310, random-access memory (RAM) 322 to store data, and non-volatile (NV) memory 324 to store configuration information).

Wireless charging receiver 300 also includes receive resonant circuit 335 which includes an actual coil and capacitors. The coil and capacitors define the resonant circuit of wireless charging receiver 300, this coil is coupled with a coil of the resonant circuit of the wireless charging transmitter.

Output from wireless charging receiver 300 include the output voltage of RX rectifier/TX driver circuit 314 (VRECT) and the output voltage (VOUT) used to recharge the rechargeable batteries of the electronic device coupled to wireless charging receiver 300 or to power the electronic device directly. If VRECT exceeds a specified threshold, an overvoltage (OVP) condition may occur, potentially leading to an interruption in the power delivery to the electronic device or damage to electronics of wireless charging receiver 300

Changes to the received energy at wireless charging receiver 300 result in a change in the output voltage of RX rectifier/TX driver circuit (VRECT). Hence, if a change in the alignment of wireless charging receiver 300 significantly improves the coil coupling, the received energy at wireless charging receiver 300 and VRECT also increases significantly.

Wireless charging receiver 300 monitors VRECT to detect the occurrence of a first OVP and responds. After detecting the occurrence of the first OVP, by comparing VRECT with a first OVP threshold, for example, wireless charging receiver 300 enables external resistor (REXT1) 340, by enabling (or turning on or closing) switch 345, for example, establishing a current path to ground. The term "external" refers to being external to integrated circuit 305, not to wireless charging receiver 300. The current flowing through REXT1 340 reduces VRECT by dissipating a portion of the power output by RX rectifier/TX driver circuit 314 of wireless charging receiver 300.

However, unless wireless charging receiver 300 is able to communicate with the wireless charging transmitter regarding the OVP condition, the wireless charging transmitter will not change its operating point. Because the operating point remains unchanged, the wireless charging transmitter will continue to provide more energy than needed by wireless charging receiver 300 and (because coupling is improved) VRECT continues to increase, even with REXT1 340 dissipating a portion of the power.

Wireless charging receiver 300 monitors VRECT to detect the occurrence of a second OVP and responds. After detecting the occurrence of the second OVP, by comparing VRECT with a second OVP threshold, for example, wireless charging receiver 300 short circuits receive resonant circuit 335 to ground, by enabling (or turning on or closing) switches 350, for example. Short circuiting receive resonant circuit 335 to ground discharges VRECT. VRECT may drop until wireless charging receiver 300 detects that VRECT reaches a low voltage threshold (e.g., UVLO). Wireless charging receiver 300 may then reset and initiate a new wireless charging session.

Figure 4:
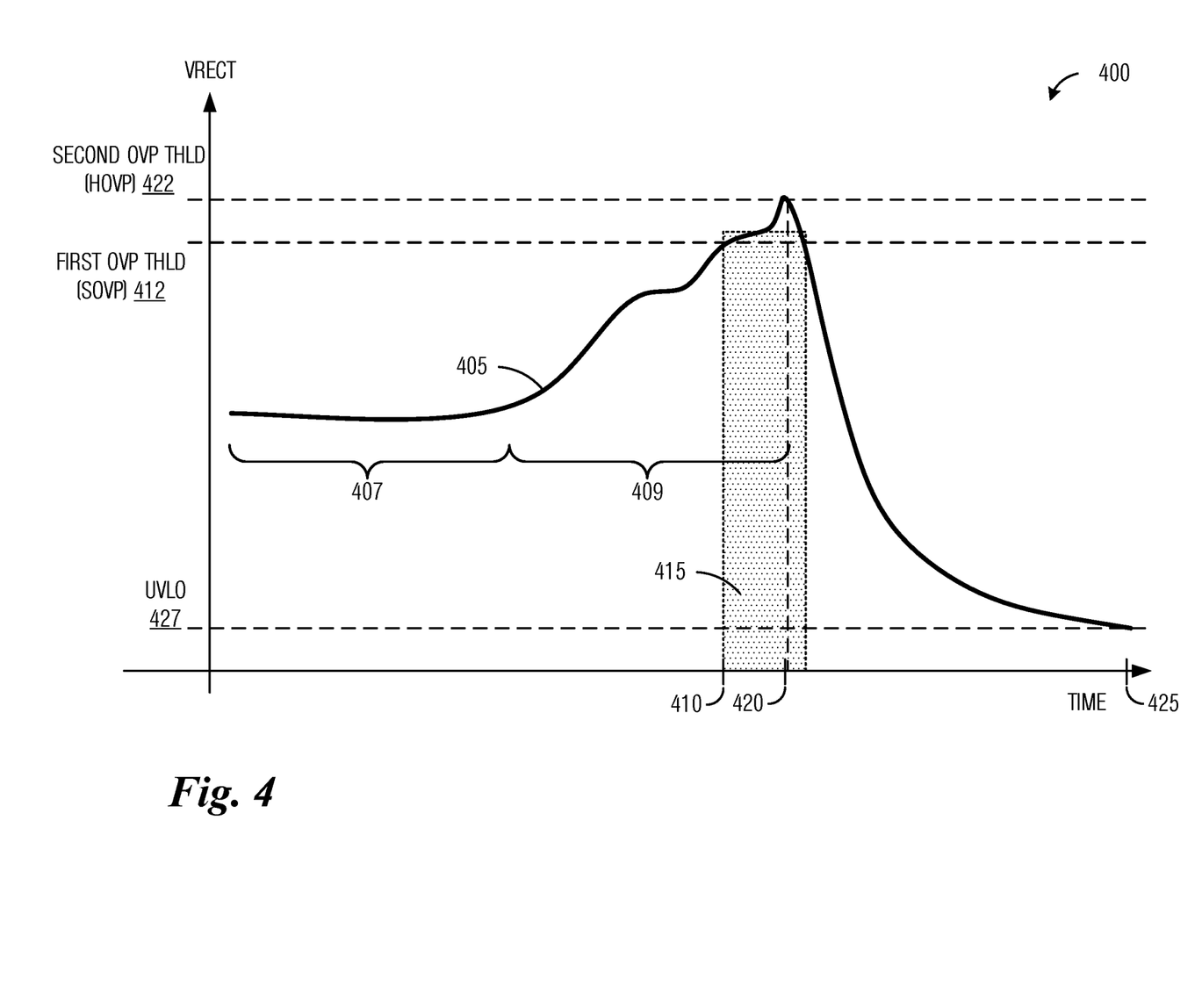
FIG. 4 illustrates a diagram of VRECT over time highlighting the behavior of prior art wireless charging receiver of FIG. 3 in an OVP condition leading to poor charging performance as identified by the inventors of this application.

FIG. 4 illustrates a diagram 400 of VRECT over time highlighting the behavior of prior art wireless charging receiver 300 of FIG. 3 in an OVP condition leading to poor charging performance as identified by the inventors of this application. A trace 405 represents VRECT over time. During a first time interval 407, VRECT remains stable, indicating that a wireless charging session is progressing as intended. However, during a second time interval 409, VRECT increases sharply. The sharp increase in VRECT may indicate that wireless charging receiver 300 is receiving greater energy than during interval 407, perhaps due to a change in the alignment of wireless charging receiver 300 and the wireless charging transmitter that improves coil coupling, for example.

At about time 410, wireless charging receiver 300 determines that a first OVP has occurred (by comparing VRECT with first OVP threshold (SOVP) 412, for example). Wireless charging receiver 300 turns on external resistor REXT1 340 by enabling switch 345 to establish a current path to ground. REXT1 340 dissipates power (shown as region 415). In general, external resistor REXT1 is turned on whenever VRECT is greater than first OVP threshold (SOVP) 412.

Although REXT1 340 is dissipating power, VRECT continues to increase (because wireless charging receiver 300 continues to receive more energy than needed). At about time 420, wireless charging receiver 300 determines that a second OVP has occurred (by comparing VRECT with second OVP threshold (HOVP) 422, for example). Wireless charging receiver 300 short circuits receive resonant circuit 335 to ground by enabling switches 350. VRECT drops rapidly after receive resonant circuit 335 is short circuited to ground. At about time 425, VRECT drops below low voltage threshold (UVLO) 427 and wireless charging receiver 300 resets and initiates a new wireless charging session with the wireless charging transmitter or the wireless charging transmitter simply stops providing power due to a communication timeout because wireless charging receiver 300 has not communicated with the wireless charging transmitter in the time interval between time 420 and time 425.

After receive resonant circuit 335 is short circuited, very little to no power is available to recharge the rechargeable batteries or power the electronic device coupled to wireless charging receiver 300. Furthermore, when wireless charging receiver 300 resets, the power delivery to the electronic device coupled to wireless charging receiver 300 is interrupted because the wireless charging transmitter stopped providing power because of unexpected communication during power transfer after reset of wireless charging receiver 300 or due to lack of communication during an extended time duration (i.e., a communication timeout). Therefore, there is a need to reduce the duration of time (from about time 420 to about time 425) that receive resonant circuit 335 is short circuited and to avoid reset of wireless charging receiver 300 so that power transfer is not interrupted.

According to an example embodiment, receive resonant circuit switches with hysteresis operation are provided. Instead of simply short circuiting the receive resonant circuit to ground with switches, receive resonant circuit switches with hysteresis operation short circuits the receive resonant circuit to ground or its own terminals until VRECT drops below a hysteresis threshold (HOVP HYST). Once the hysteresis threshold (HOVP HYST) is met, the receive resonant circuit switches are disabled to break the short circuit, allowing the wireless charging receiver to resume normal operation. With the wireless charging receiver resuming normal operation, VRECT will increase (because the wireless charging receiver continues to receive more energy than needed) until the second OVP threshold (HOVP) is again met, at which time, the receive resonant circuit switches with hysteresis operations are enabled to short circuit the receive resonant circuit to ground or its own terminals. The receive resonant circuit switches being enabled and disabled as VRECT rises and falls between the second OVP threshold (HOVP) and the hysteresis threshold are referred to as hysteresis cycles, with a single hysteresis cycle comprising a single enable-disable cycle of the receive resonant circuit switches with hysteresis operation. Theoretically, the hysteresis operation can continue indefinitely but because the communication from the wireless charging receiver to the wireless charging transmitter cannot be properly decoded at the wireless charging transmitter side due to disturbance arising from the short circuiting of the receive resonant circuit to ground, the number of hysteresis cycles should be limited. While the wireless charging receiver is operating in hysteresis operation, the charging of rechargeable batteries coupled to the wireless charging receiver continues.

In an embodiment, the receive resonant circuit switches with hysteresis operation has a hysteresis window built into the design. The hysteresis operation is therefore inherent in the design. Hence, the receive resonant circuit switches may disable automatically when a hysteresis condition is met. In an embodiment, hysteresis operation is simulated with the receive resonant circuit switches by the wireless charging receiver comparing VRECT with a hysteresis condition (e.g., a voltage threshold) and enabling or disabling the receive resonant circuit switches in accordance with the relationship between VRECT and the hysteresis condition and the second OVP threshold (HOVP).

In an embodiment, the number of hysteresis cycles is configurable. Although charging the rechargeable batteries coupled to the wireless charging receiver continues during the hysteresis cycles, the charging may not be as efficient because VRECT varies between the hysteresis threshold and the second OVP threshold (HOVP), hence the power available to charge the rechargeable battery varies. Furthermore, communication from the wireless charging receiver to the wireless charging transmitter is not stable nor reliable during hysteresis operation. Therefore, it may not be beneficial to allow the wireless charging receiver to indefinitely operate in hysteresis operation. In an embodiment, the number of hysteresis cycles may be a counting threshold, i.e., a specific number of times hysteresis cycles have occurred. In an embodiment, the number of hysteresis cycles may be a time threshold, i.e., a time duration that corresponds to about the configured number of hysteresis cycles. As an example, the number of hysteresis cycles is as small as one, meaning that as soon as the receive resonant circuit switches are enabled to short circuit the receive resonant circuit to ground or its own terminals and VRECT drops below hysteresis threshold, the wireless charging receiver attempts to restore normal operation by proceeding to a next step of the protection (e.g., REXT2 enable) which allows communication with the wireless charging transmitter. As an example, the number of hysteresis cycles is sufficiently large to allow for transient changes in coil coupling to resolve before the wireless charging receiver enables REXT2 and tries to restore normal operation. The number of hysteresis cycles should be large enough to allow for a few seconds of hysteresis cycling before the wireless charging receiver attempts to restore normal operation. For example, the number of hysteresis cycles is on the order of 1-20 depending on the load provided to the device. As an example, low load implies more hysteresis cycles, while high load implies less hysteresis cycles.

According to an example embodiment, after the occurrence of the configured number of hysteresis cycles, a second external resistor REXT2 is turned on to establish a second current path between VRECT and ground (where external resistor REXT1 provides a first current path between VRECT and ground). In an embodiment, the power dissipated by the second external resistor REXT2 sufficiently reduces VRECT by potentially preventing VRECT from meeting the second OVP threshold (HOVP), thereby preventing the wireless charging receiver from having to short circuit the receive resonant circuit to ground or its own terminals and allowing the wireless charging receiver to communicate with the wireless charging transmitter to request the wireless charging transmitter changes the operating point to reduce the energy transmitted to the wireless charging receiver. The reduced energy transmitted by the wireless charging transmitter reduces the energy received by the wireless charging receiver, potentially preventing the overvoltage condition from continuing.

In an embodiment, the value of the second external resistor REXT2 is sufficiently small to dissipate enough power to sufficiently reduce VRECT to give the wireless charging receiver sufficient time to communicate with the wireless charging transmitter to request that the wireless charging transmitter change its operating point. In an embodiment, the second external resistor REXT2 is smaller in value than the external resistor REXT1.

Figure 5A:
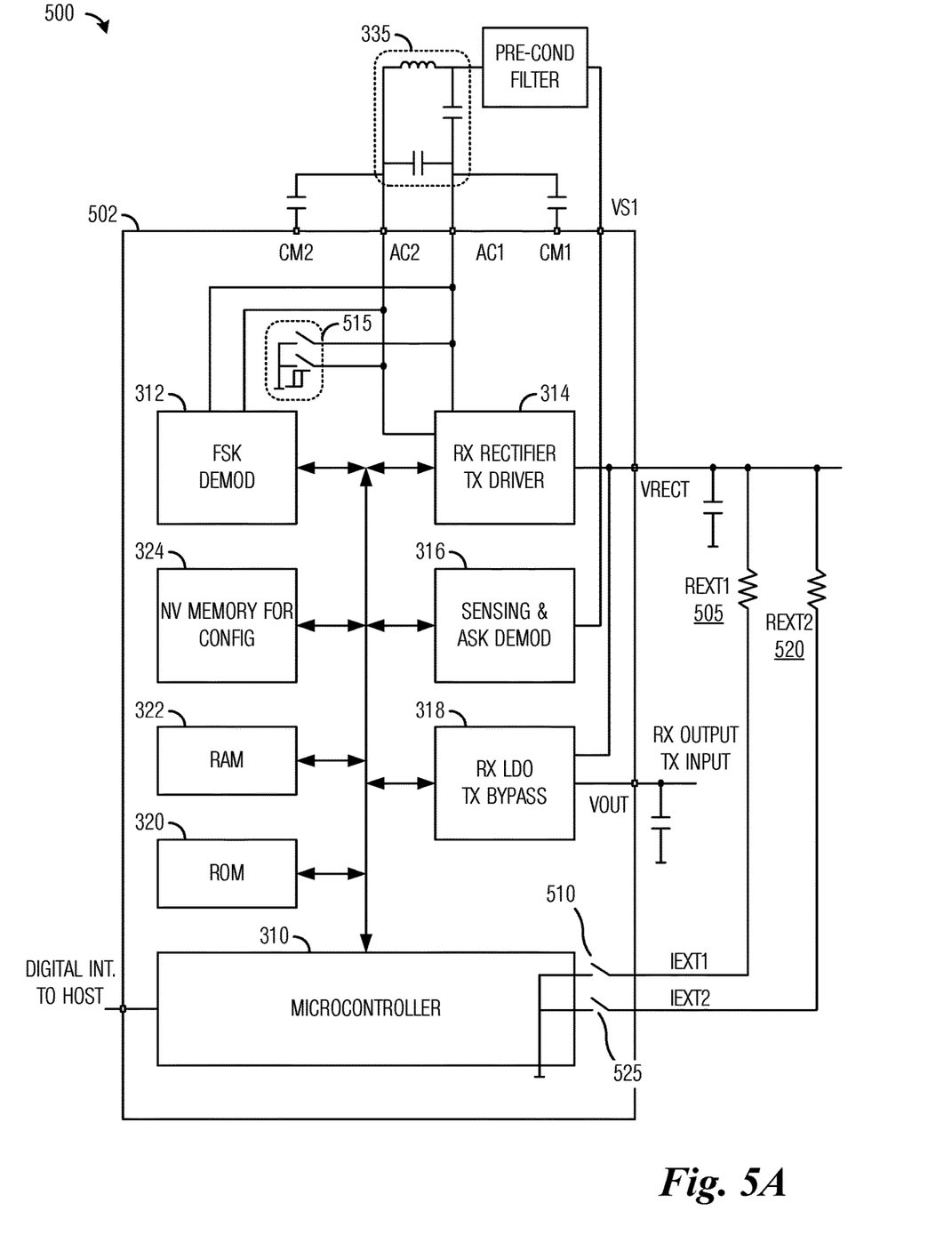
FIG. 5A illustrates a first example wireless charging receiver according to the embodiments presented herein.

FIG. 5A illustrates a first example wireless charging receiver 500 according to the embodiments presented herein. Wireless charging receiver 500 includes an integrated circuit 502 that includes circuitry that controls the operation of wireless charging receiver 500, where the circuitry are labeled with reference numerals. In situations where the reference numerals used in FIG. 5 are similar to reference numerals used in FIG. 3, the associated circuits operate similarly.

Wireless charging receiver 500 includes external resistor REXT1 505 that is controllably coupled to ground by switch 510 when VRECT meets first OVP threshold (SOVP). External resistor REXT1 505 is external to integrated circuit 502, but not to wireless charging receiver 500. External resistor REXT1 505 should be large to dissipate and sustain a large current for an extended time period to increase the amount of time before VRECT meets second OVP threshold (HOVP). Wireless charging receiver 500 also includes receive resonant circuit switches with hysteresis operation 515 that, when enabled, short circuits receive resonant circuit 335 to ground. Receive resonant circuit switches with hysteresis operation 515 are enabled when VRECT meets second OVP threshold (HOVP), for example, and are disabled when VRECT meets hysteresis threshold, for example. When receive resonant circuit switches with hysteresis operation 515 are enabled, VRECT drops, and when receive resonant circuit switches with hysteresis operation 515 are disabled, VRECT rises. If receive resonant circuit switches with hysteresis operation 515 have a hysteresis window built into the design, receive resonant circuit switches with hysteresis operation 515 may automatically enable or disable based on VRECT. If receive resonant circuit switches with hysteresis operation 515 do not have a hysteresis window built into the design, microcontroller 310 may simulate hysteresis operation by comparing VRECT with the second OVP threshold (HOVP) to determine when to enable receive resonant circuit switches with hysteresis operation 515 and with the hysteresis threshold to determine when to disable receive resonant circuit switches with hysteresis operation 515. An enable-disable cycle of receive resonant circuit switches with hysteresis operation 515 is referred as a hysteresis cycle.

Wireless charging receiver 500 further includes second external resistor REXT2 520 that is controllably coupled to ground by switch 525 when wireless charging receiver 500 has gone through a configured number of hysteresis cycles. Second external resistor REXT2 520 is external to integrated circuit 502, but not to wireless charging receiver 500. When second external resistor REXT2 520 is coupled to ground, a current path is established and second external resistor REXT2 520 dissipates power and reduces VRECT. The reduction in VRECT is sufficient to prevent a subsequent hysteresis cycle and allows wireless charging receiver 500 to communicate with the wireless charging transmitter, to request that the wireless charging transmitter change its operating point to reduce the energy received by wireless charging receiver, for example. Even with both external resistor REXT1 505 and second external resistor REXT2 dissipating power, VRECT may continue to rise. However, the rise in VRECT is generally gradual and smooth, and therefore does not prevent communication between wireless charging receiver 500 and the wireless charging transmitter from taking place. If VRECT from any reason rises and meets the second OVP threshold (HOVP), even when REXT2 and REXT1 are dissipating power, receive resonant circuit switches with hysteresis operation 515 will be enabled permanently until VRECT drops below UVLO. The hysteresis function of receive resonant circuit switches with hysteresis operation 515 is disabled in this situation.

In an embodiment, switches 510, 515, and 525 may be implemented using field effect transistors (FETs), such as junction FETs (JFETs), N channel JFETs, P channel JFETs, metal-oxide-semiconductor FETs (MOSFETs), enhancement mode MOSFETs, depletion mode MOSFETs, and so on.

Figure 5B:
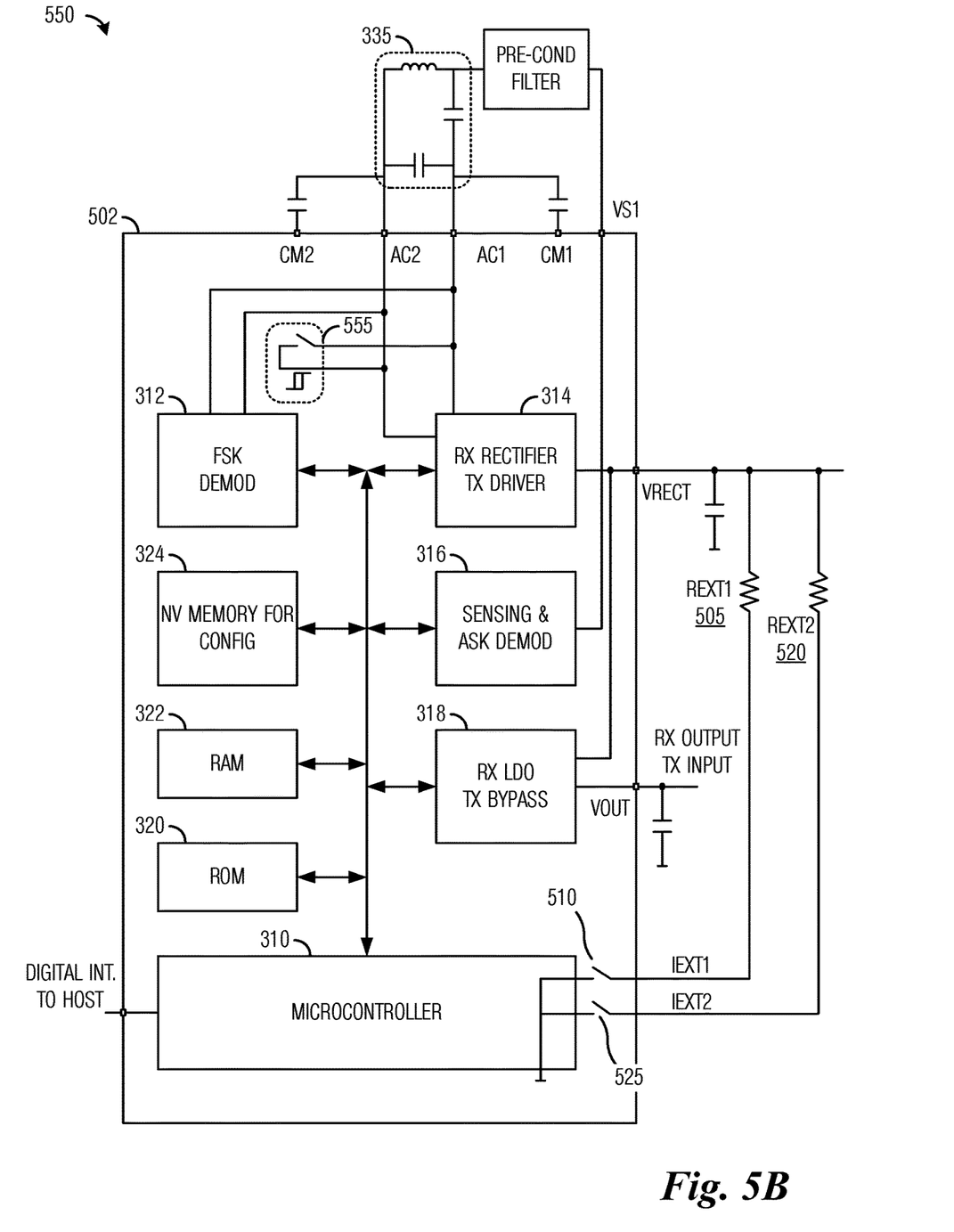
FIG. 5B illustrates a second example wireless charging receiver according to the embodiments presented herein.

FIG. 5B illustrates a second wireless charging receiver 550 according to the embodiments presented herein. Wireless charging receiver 550 is similar to wireless charging receiver 500 with similar reference numerals referencing similar circuits. Wireless charging receiver 550 includes receive resonant circuit switch with hysteresis operation 555 that is coupled across terminals of receive resonant circuit 335. Hence, when enabled, receive resonant circuit switch with hysteresis operation 555 short circuits the terminals of receive resonant circuit 335 instead of short circuiting receive resonant circuit 335 to electrical ground as receive resonant circuit switches with hysteresis operation 515 of FIG. 5A. However, short circuiting the terminals of receive resonant circuit 335 also causes VRECT to drop, just as short circuiting receive resonant circuit 335 to electrical ground.

Figure 6A:
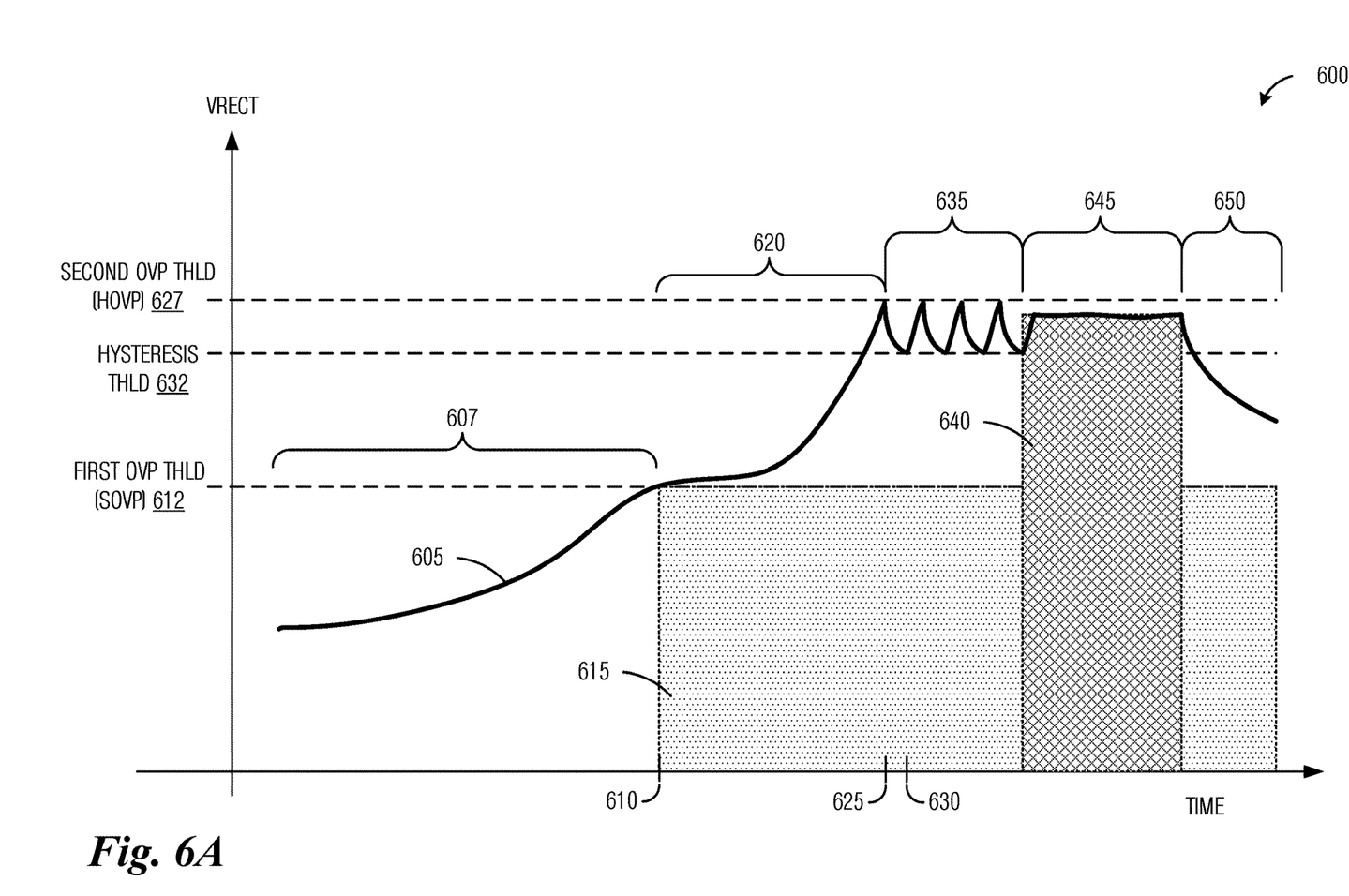
FIG. 6A illustrates a diagram of VRECT over time highlighting the behavior of wireless charging receiver of FIG. 5A in an OVP condition according to the embodiments presented herein.

FIG. 6A illustrates a diagram 600 of VRECT over time highlighting the behavior of wireless charging receiver 500 of FIG. 5A in an OVP condition according to the embodiments presented herein. Although the discussion of FIG. 6A (as well as FIG. 6B) focusses on wireless charging receiver 500 of FIG. 5A, the behavior illustrated in FIGS. 6A and 6B also applies to wireless charging receiver 550 of FIG. 5B. Therefore, the focus on wireless charging receiver 500 should not be construed as being limiting to the scope of the invention.

A trace 605 represents VRECT over time. During a first time interval 607, VRECT increases at a relatively steady rate. At about time 610, wireless charging receiver 500 determines that a first OVP has occurred (by comparing VRECT with first OVP threshold (SOVP) 612, for example). Wireless charging receiver 500 turns on external resistor REXT1 505 by enabling switch 510 to establish a current path to ground. REXT1 505 dissipates power (shown as region 615).

During a second time interval 620, VRECT continues to increase at a relatively steady rate (after an initial rate decrease corresponding to the turning on of external resistor REXT1 505). At about time 625, wireless charging receiver 500 determines that a second OVP has occurred (by comparing VRECT with second OVP threshold (HOVP) 627, for example). Wireless charging receiver 500 enables receive resonant circuit switches with hysteresis operation 515 to short circuit receive resonant circuit 335, to ground or across its terminals. The enabling of receive resonant circuit switches with hysteresis operation 515 causes VRECT to drop. At about time 630, wireless charging receiver 500 determines that hysteresis threshold 632 is met and disables receive resonant circuit switches with hysteresis operation 515 to decouple receive resonant circuit 335, from ground or its own terminals.

After wireless charging receiver 500 completes a specified number of hysteresis cycles (shown as interval 635), wireless charging receiver 500 turns on second external resistor REXT2 520 by enabling switch 525 to establish a current path to ground. REXT2 520 dissipates power (shown as region 640). The power dissipated by REXT2 520 reduces VRECT and stops the hysteresis cycles (shown as interval 645), at least temporarily, which allows wireless charging receiver 500 to communicate with the wireless charging transmitter. Wireless charging receiver 500 may request that the wireless charging transmitter change its operating point to reduce the energy received by wireless charging receiver 500, for example. Wireless charging receiver 500 may send an indication of its current received energy and the wireless charging transmitter may adjust the transmit energy level or operating point based on the indication, for example. After the wireless charging transmitter changes its operating point, the energy received by wireless charging receiver 500 drops, resulting in a VRECT drop (shown as interval 650). In an embodiment, wireless charging receiver 500 may also request the wireless charging transmitter, in time interval 645, to stop the power transfer all together.

In an embodiment, second external resistor REXT2 520 is turned on for a limited amount of time to protect second external resistor REXT2 520 and associated switch 525 from damage. During the time that second external resistor REXT2 520 is on, wireless charging receiver 520 communicates with the wireless charging transmitter to change the operating point of the wireless charging transmitter. In an embodiment, the amount of time that second external resistor REXT2 520 is on is configurable. The amount of time may be based on the load of the device coupled to wireless charging receiver 500, for example.

In an embodiment, power transfer continues even during hysteresis operation (i.e., interval 635 of FIG. 6), allowing wireless charging to continue. In an embodiment, power transfer also continues after second external resistor REXT2 520 is turned on and commences power dissipation. In an embodiment, the wireless charging session does not need to be discontinued and VRECT does not need to drop below the low voltage threshold (e.g., UVLO 427 of FIG. 4) before a new wireless charging session is initiated. Because the wireless charging session does not need to be discontinued and a new wireless charging session does not need to be initiated, wireless charging efficiency may be increased and wireless charging time may be reduced. In such a situation, the user may not be notified by the device that the wireless charging was interrupted.

In an embodiment, if VRECT drops to a sufficient level, wireless charging receiver 500 turns off second external resistor REXT2 520 so that second external resistor REXT2 520 is no longer dissipating power. Second external resistor REXT2 520 is turned on only for limited time needed for communication to the wireless charging transmitter, and for the wireless charging transmitter to adjust of the operating point to avoid damage to wireless charging receiver 500. Within the time that second external resistor REXT2 520 is turned on, the wireless charging transmitter responds to the communication and changes its operating point.

If the wireless charging transmitter does not respond and adjust the operating point, second external resistor REXT2 520 is turned off. VRECT meets the second OVP threshold (HOVP) and receiver resonant circuit 335 is short circuited permanently until VRECT drops below the low voltage threshold (UVLO) and wireless charging receiver 500 resets.

Figure 6B:
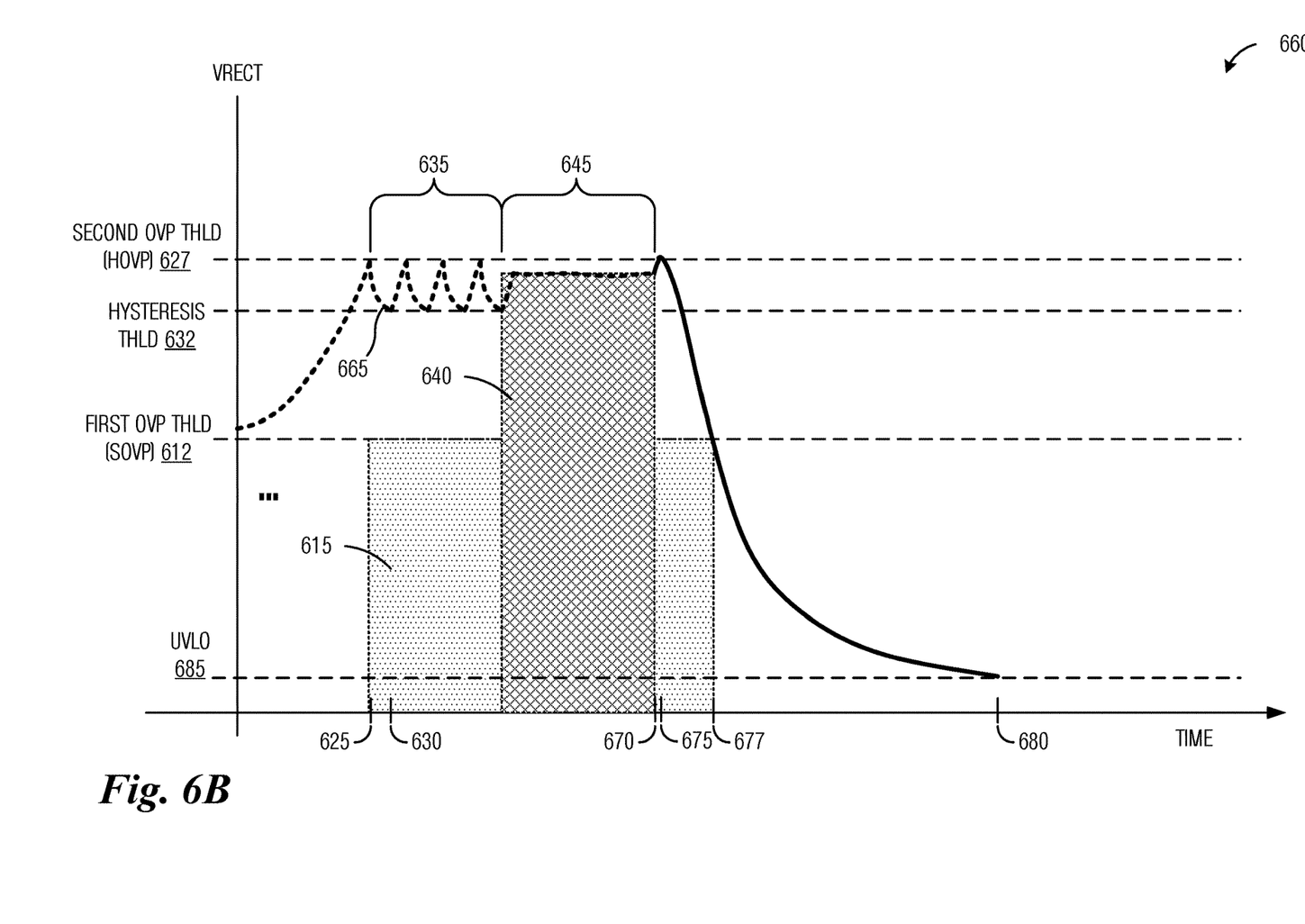
FIG. 6B illustrates a diagram of VRECT over time highlighting the behavior of wireless charging receiver of FIG. 5A in an OVP condition, but the wireless charging transmitter does not respond within a time limit according to the embodiments presented herein.

FIG. 6B illustrates a diagram 650 of VRECT over time highlighting the behavior of wireless charging receiver 500 of FIG. 5A in an OVP condition, but the wireless charging transmitter does not respond within a time limit corresponding to when second external resistor REXT2 520 is turned on, according to the embodiments presented herein. As shown in FIG. 6B, VRECT (trace 665), up until the end of interval 645, is identical as VRECT (trace 605) shown in FIG. 6A, and some portions are omitted to simplify the figure. However, at the end of interval 645, the wireless charging transmitter has not responded to communication from wireless charging receiver 500 (e.g., a request to reduce its power transmission). Therefore, at about time 670, wireless charging receiver 500 turns off second external resistor REXT2 520 and VRECT resumes increasing.

At about time 675, wireless charging receiver 500 determines that a second OVP has occurred (by comparing VRECT with second OVP threshold (HOVP) 627, for example). Wireless charging receiver 500 short circuits receive resonant circuit 335 (to ground or across its own terminals as in FIG. 5B) by enabling receive resonant circuit switches with hysteresis operation 515 with disabled hysteresis operation to short circuit receive resonant circuit 335. VRECT drops rapidly after receive resonant circuit 335 is short circuited to ground (FIG. 5A) or across its own terminals (FIG. 5B). At about time 677, VRECT drops below first OVP threshold (SOVP) and wireless charging receiver 500 disables external resistor REXT1 505. At about time 680, VRECT drops below low voltage threshold (UVLO) 685 and wireless charging receiver 500 resets and initiates a new wireless charging session with the wireless charging transmitter or the wireless charging transmitter simply stops providing power due to a communication timeout because wireless charging receiver 500 has not communicated with the wireless charging transmitter in the time interval between time 625 and time 680.

In an embodiment, if VRECT drops to a sufficient level, wireless charging receiver 500 turns off external resistor REXT1 505 so that external resistor REXT1 505 is no longer dissipating power. Turning off external resistor REXT1 505 may temporarily increase VRECT.

Figure 7:
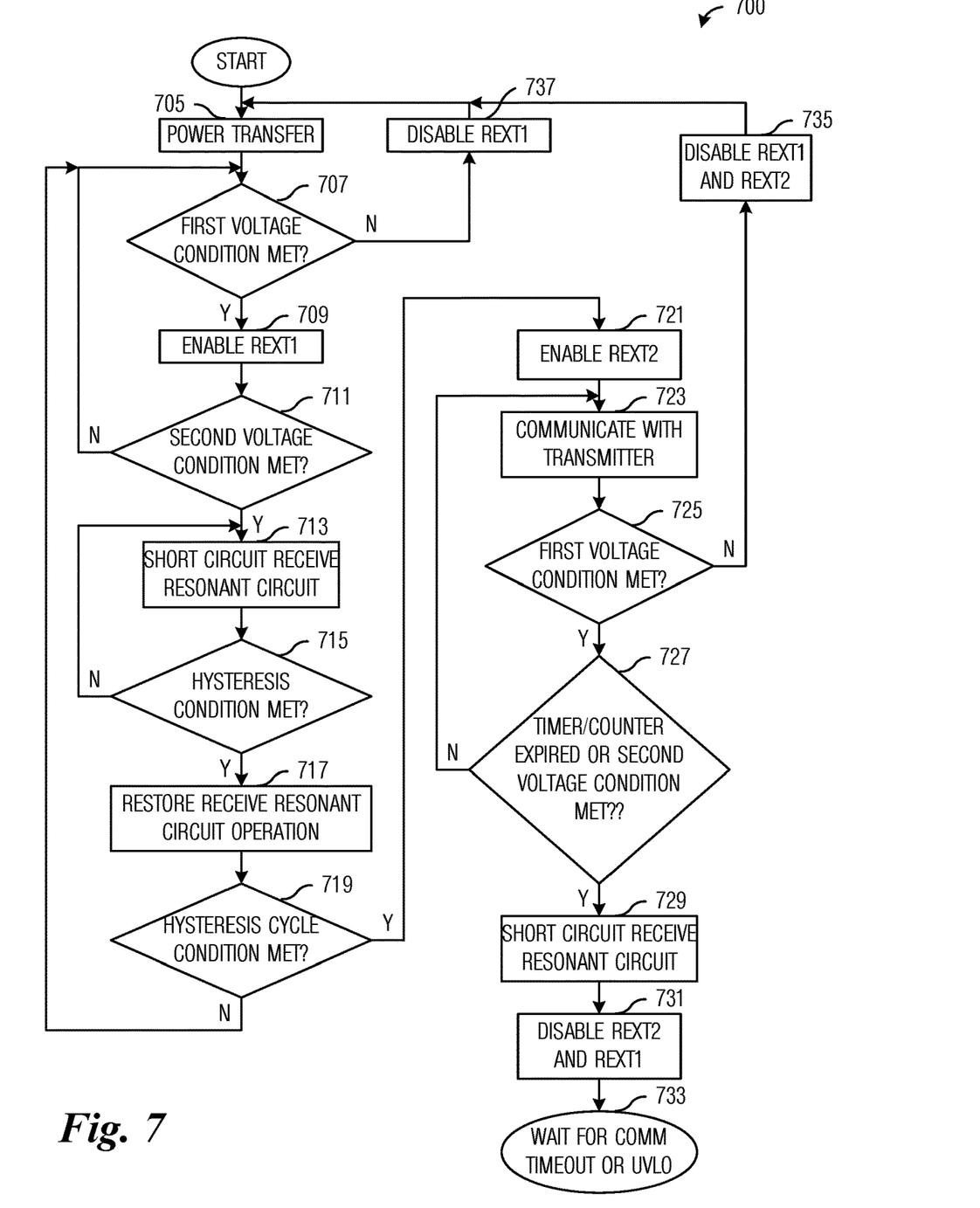
FIG. 7 illustrates a flow diagram of example operations occurring in a wireless charging receiver according to the embodiments presented herein.

FIG. 7 illustrates a flow diagram of example operations 700 occurring in a wireless charging receiver according to the embodiments presented herein. Operations 700 may be indicative of operations occurring in a wireless charging receiver as the wireless charging receiver responds to an OVP condition. The wireless charging receiver responds to the OVP condition and takes steps to recover from the OVP condition. Operations 700 may be performed in a microcontroller, processor, or microprocessor of the wireless charging receiver.

Operations 700 begin with the wireless charging receiver performing a power transfer with the wireless charging transmitter (block 705). The power transfer may be a part of a wireless charging session established between the wireless charging receiver and the wireless charging transmitter. The wireless charging receiver performs a check to detect (or determine) if a first voltage condition is met (block 707). The wireless charging receiver may detect (or determine) if the first voltage condition is met by comparing VRECT with a first OVP threshold (SOVP), for example. If VRECT meets the first OVP threshold (SOVP), the wireless charging receiver enables or turns on the external resistor REXT1 (block 709). The wireless charging receiver may enable or turn on the external resistor REXT1 by enabling a switch that couples the external resistor REXT1 to ground, for example. Enabling (or turning on) the external resistor REXT1 establishes a current path between VRECT and ground. If the first voltage condition is not met, the wireless charging receiver disables or turns off the external resistor REXT1 (block 737) and continues with the power transfer (block 705).

The wireless charging receiver performs a check to detect (or determine) if a second voltage condition is met (block 711). The wireless charging receiver may detect (or determine) if the second voltage condition is by comparing VRECT with a second OVP threshold (HOVP), for example. If VRECT meets the second OVP threshold (HOVP), the wireless charging receiver short circuits the receive resonant circuit (block 713). The wireless charging receiver may short circuit the receive resonant circuit to ground or short circuit the terminals of the receive resonant circuit, thereby discharging the VRECT. The wireless charging receiver enables the receive resonant circuit switches with hysteresis operation to short circuit the receive resonant circuit, for example. If the second voltage condition is not met, the wireless charging receiver continues to monitor the second and first overvoltage condition by returning to block 707.

The wireless charging receiver performs a check to detect (or determine) if a hysteresis condition is met (block 715). A check of the hysteresis condition is a check to detect (or determine) if VRECT has dropped by a sufficient amount and the receive resonant circuit may be turned back on (i.e., stop short circuiting the receive resonant circuit to ground or stop short circuiting the terminals of the receive resonant circuit), for example. If the hysteresis condition is not met, the wireless charging receiver keeps the receive resonant circuit short circuited (block 713). If the hysteresis condition is met (e.g., VRECT<Hysteresis threshold), the wireless charging receiver restores receive resonant circuit operation (block 717). The wireless charging receiver may restore receive resonant circuit operation by disabling the receive resonant circuit switches with hysteresis operation, for example, to decouple the receive resonant circuit from ground or decouple the terminals of the receive resonant circuit.

The wireless charging receiver performs a check to detect (or determine) if a hysteresis cycle condition is met (block 719). The hysteresis cycle condition is related to the number of hysteresis cycles that the wireless charging receiver has undergone and may be a check of the configured number of hysteresis cycles or a time duration related to the configured number of hysteresis cycles. If the hysteresis cycle condition is met, the wireless charging receiver enables or turns on the second external resistor REXT2 (block 721). The wireless charging receiver may enable or turn on the second external resistor REXT2 by enabling a switch that couples the second external resistor REXT2 to ground, for example. Enabling (or turning on) the second external resistor REXT2 establishes a second current path between VRECT and ground. If the hysteresis cycle condition is not met, the wireless charging receiver returns to block 707 to perform a check to detect if the first and second voltage are met and continue in hysteresis cycle operation. First voltage condition is checked to enable an exit OVP protection scheme in case VRECT accidentally drops below SOVP and return to normal operation. Blocks 737 and 705 comprise the exit OVP protection scheme.

With the second external resistor REXT2 enabled, the wireless charging receiver communicates with the wireless charging transmitter (block 723). The wireless charging receiver may request the wireless charging receiver transmitter reduce the transmitted power, for example. Alternatively, the wireless charging receiver communicates its current received power level or VRECT to indicate to the wireless charging transmitter that the wireless charging receiver is experiencing an overvoltage condition.

The wireless charging receiver performs a check to detect (or determine) if a first voltage condition is met (block 725). The wireless charging receiver may detect (or determine) if the first voltage condition is met by comparing VRECT with the first OVP threshold (SOVP), for example. If VRECT meets the first OVP threshold (SOVP), which means VRECT>SOVP, for example, the wireless charging receiver performs a check to detect (or determine) if a timer or counter has expired or if the second voltage condition is met (block 727). The timer or counter may be associated a time interval when the second external resistor REXT2 is enabled, for example. In other words, the wireless charging receiver performs the check to determine if it has been able to communicate with the wireless charging transmitter within a time interval when the second external resistor REXT2 is enabled and VRECT level dropped below first OVP threshold (SOVP). If the timer or counter has not expired, the wireless charging receiver returns to block 723 to continue communicating (or continue trying to communicate) with the wireless charging transmitter.

If the timer or counter has expired or the second voltage condition is met (VRECT>HOVP), the wireless charging transmitter short circuits the receive resonant circuit (block 729). The wireless charging receiver may short circuit the receive resonant circuit to ground or short circuit the terminals of the receive resonant circuit, thereby discharging the VRECT. The wireless charging receiver enables the receive resonant circuit switches without hysteresis operation (the switch is permanently enabled until UVLO is met, for example) to short circuit the receive resonant circuit, for example. The wireless charging receiver also disables or turns off the second external resistor REXT2 and REXT1 (block 731). The wireless charging receiver may disable or turn off the second external resistor REXT2 by disabling the switch that couples the second external resistor REXT2 to ground, for example. Disabling (or turning off) the second external resistor REXT2 breaks the second current path between VRECT and ground. The wireless charging receiver waits for a communication timeout to occur or VRECT to drop below the UVLO threshold (block 733). In either case (e.g., the communication timeout or VRECT dropping below the UVLO threshold), the wireless charging session may be terminated and a new wireless charging session established.

If the wireless charging receiver detected (or determined) that the first voltage condition is not met (block 725), the power transmitted by the wireless charging transmitter has been reduced to a level sufficiently low (or the power received by the wireless charging receiver has reduced to a level sufficiently low) such that VRECT has dropped out of the overvoltage condition and the wireless charging receiver disables both the external resistor REXT1 and the second external resistor REXT2 (block 735) and returns back to power transfer in block 705.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A wireless charging receiver comprising:
   a voltage rectifier operatively coupled to a receive resonant circuit, the voltage rectifier configured to output a direct current (DC) voltage in accordance with received energy received by the receive resonant circuit from a wireless charging transmitter;
   a first resistor operatively coupled to an output of the voltage rectifier;
   a second resistor operatively coupled to the output of the voltage rectifier;
   receive resonant circuit switches operatively coupled to the receive resonant circuit;
   a first switch operative coupled between the first resistor and an electrical ground;
   a second switch operatively coupled between the second resistor and the electrical ground; and
   a controller operatively coupled to the receive resonant circuit switches, the first switch, and the second switch, the controller programmed to
      determine that a first overvoltage threshold is met and based thereon enable the first switch to couple the first resistor to the electrical ground,
      determine that a second overvoltage threshold is met and based thereon enable the receive resonant circuit switches to short circuit the receive resonant circuit,
      determine that a hysteresis threshold is met and based thereon disable the receive resonant circuit switches to open circuit the receive resonant circuit, and
      determine that a hysteresis cycle threshold is met and based thereon enable the second switch to couple the second resistor to the electrical ground.

2. The wireless charging receiver of claim 1, wherein the controller is further programmed to communicate with the wireless charging transmitter to change an operating point of the wireless charging transmitter after the second switch is enabled.

3. The wireless charging receiver of claim 2, wherein the operating point is changed to reduce the received energy received by the receive resonant circuit.

4. The wireless charging receiver of claim 1, wherein the first resistor is larger than the second resistor.

5. The wireless charging receiver of claim 1, wherein the first overvoltage threshold is lower than the second overvoltage threshold.

6. The wireless charging receiver of claim 1, wherein the receive resonant circuit is short circuited across terminals of the receive resonant circuit.

7. The wireless charging receiver of claim 1, wherein the receive resonant circuit is short circuited to electrical ground.

8. The wireless charging receiver of claim 1, wherein the hysteresis cycle threshold is one of a cycle count threshold or an elapsed time threshold.

9. The wireless charging receiver of claim 1, wherein the first overvoltage threshold is met when the DC voltage is greater than the first overvoltage threshold.

10. The wireless charging receiver of claim 1, wherein the wireless charging receiver is coupled to an electronic device having a rechargeable battery, and wherein the wireless charging receiver charges the rechargeable battery or powers the electronic device.

11. The wireless charging receiver of claim 10, wherein the wireless charging receiver continues to charge the rechargeable battery or power the electronic device after any one or more of the first overvoltage threshold, the second overvoltage threshold, the hysteresis threshold is met, or the hysteresis cycle threshold, is met.

12. A method implemented by a wireless charging receiver, the method comprising:
   detecting that a first overvoltage threshold is met, and based thereon, enabling a first switch to couple a first resistor to an electrical ground, the first resistor being coupled to an output of a rectifier of the wireless charging receiver;
   detecting that a second overvoltage threshold is met, and based thereon, enabling receive resonant circuit switches to short circuit a receive resonant circuit of the wireless charging receiver;
   detecting that a hysteresis threshold is met and based thereon, disabling the receive resonant circuit switches to open circuit the receive resonant circuit; and detecting that a hysteresis cycle threshold is met, and that the receive resonant circuit switches are disabled, and based thereon, enabling a second switch to couple a second resistor to the electrical ground.

13. The method of claim 12, further comprising communicating with a wireless charging transmitter to change an operating point of the wireless charging transmitter.

14. The method of claim 12, the first resistor being larger than the second resistor.

15. The method of claim 12, the receive resonant circuit is short circuited to electrical ground.

16. The method of claim 12, the receive resonant circuit being short circuited across terminals of the receive resonant circuit.

17. The method of claim 12, the wireless charging receiver continuing to charge a rechargeable battery of an electronic device or power the electronic device after any one or more of the first overvoltage threshold, the second overvoltage threshold, the hysteresis threshold, or the hysteresis cycle threshold, is met.

18. A wireless charging receiver comprising:
a voltage rectifier operatively coupled to a receive resonant circuit, the voltage rectifier configured to output a direct current (DC) voltage in accordance with received energy received by the receive resonant circuit from a wireless charging transmitter;
a first resistor operatively coupled to an output of the voltage rectifier;
a second resistor operatively coupled to the output of the voltage rectifier;
receive resonant circuit switches operatively coupled to the receive resonant circuit;
a first switch operatively coupled between the first resistor and an electrical ground;
a second switch operatively coupled between the second resistor and the electrical ground;
a non-transitory memory storage comprising instructions; and
one or more processors in communication with the memory storage, wherein the one or more processors execute the instructions to:
determine that a first overvoltage threshold is met, and based thereon, enable the first switch to couple the first resistor to the electrical ground, the first resistor being coupled to an output of a rectifier of the wireless charging receiver;
determine that a second overvoltage threshold is met, and based thereon, enable receive resonant circuit switches to short circuit the receive resonant circuit of the wireless charging receiver;
determine that a hysteresis threshold is met, and based thereon, disable the receive resonant circuit switches to open circuit the receive resonant circuit; and
determine that a hysteresis cycle threshold is met and that the receive resonant circuit switches are disabled, and based thereon, enable the second switch to couple the second resistor to the electrical ground.

19. The wireless charging receiver of claim 18, wherein the one or more processors further execute the instructions to communicate with the wireless charging transmitter to change an operating point of the wireless charging transmitter.

20. The wireless charging receiver of claim 18, wherein the wireless charging receiver is coupled to an electronic device having a rechargeable battery, and wherein the wireless charging receiver charges the rechargeable battery or powers the electronic device.

* * * * *